United States Patent
Fimeri et al.

(10) Patent No.: US 7,748,857 B2
(45) Date of Patent: Jul. 6, 2010

(54) POWERED TELESCOPING VEHICLE EXTERNAL MIRROR

(75) Inventors: Garry Fimeri, Morphett Vale (AU); Mark Leonid Olijnyk, Hallet Cove (AU); Matthew John Reedman, Blackwood (AU); Simon Belcher, South Plympton (AU)

(73) Assignee: SMR Patents S.a.r.l., Luxembourg (LU)

( * ) Notice: Subject to any disclaimer, the term of this patent is extended or adjusted under 35 U.S.C. 154(b) by 341 days.

(21) Appl. No.: 10/588,097

(22) PCT Filed: Jan. 28, 2005

(86) PCT No.: PCT/AU2005/000090

§ 371 (c)(1),
(2), (4) Date: Aug. 1, 2008

(87) PCT Pub. No.: WO2005/073038

PCT Pub. Date: Aug. 11, 2005

(65) Prior Publication Data

US 2009/0080096 A1     Mar. 26, 2009

(30) Foreign Application Priority Data

Jan. 28, 2004   (AU) .............................. 2004900349

(51) Int. Cl.
*G02B 7/182*     (2006.01)

(52) U.S. Cl. ...................................... 359/877; 248/479
(58) Field of Classification Search ................. 359/841, 359/872, 877; 248/479, 480, 486
See application file for complete search history.

(56) References Cited

U.S. PATENT DOCUMENTS

| 2,241,866 | A | 5/1941 | Needham |
| 5,864,438 | A | 1/1999 | Pace |
| 6,755,543 | B1 * | 6/2004 | Foote et al. ................. 359/877 |
| 6,877,868 | B2 | 4/2005 | Olijnyk et al. |

* cited by examiner

*Primary Examiner*—Euncha P Cherry
(74) *Attorney, Agent, or Firm*—Reising Ethington P.C.

(57) ABSTRACT

A vehicle external rear view mirror assembly comprising a bracket and a mirror head, a pair of parallel outer arm assemblies (20, 20') having a front portion and a rear portion, the front portion having a rack (28, 28'), a pair of parallel inner arm assemblies (40, 40') and extending into respective outer arm assemblies (20, 20'), each inner arm assembly (40, 40') having a front portion and a rear portion, a pair of driving pinion gears (50, 50'), each engaging a respective rack (28, 28'), a pinion drive shaft (53), a drive motor (60), and a gear train, the drive motor (60) driving the inner arm assemblies (40, 40') to move telescopically with respect to their respective outer arm assemblies (20, 20'), wherein each outer arm assembly (20, 20') is recessed back from the distal end towards the bracket to allow the pinion drive shaft assembly to travel towards the bracket behind the front portion of the outer arm assembly (20, 20').

25 Claims, 10 Drawing Sheets

POWERED TELESCOPING VEHICLE EXTERNAL MIRROR

FIELD OF THE INVENTION

The present invention relates to powered telescoping vehicle external mirrors.

BACKGROUND TO THE INVENTION

For vehicles and in particular for sport utility type vehicles (SUV's), it is desirable to be able to move a mirror head which holds the mirror with respect to a mounting bracket on the vehicle away from or back towards the mounting bracket. This enables the mirror head to be positioned either close to the side of the motor vehicle, or to be extended away from the motor vehicle. In its extended position, an increased (wider) useful field of view behind the vehicle is provided. This is important where the rear view may be obstructed by a load on the vehicle or a trailer that is being towed for instance.

Various powered telescoping external vehicle mirrors have been developed. For larger mirrors twin telescopic arms are commonly used. With some designs, the twin arms each comprise a hollow outer arm and an inner arm. The hollow outer arm is connected to the bracket and the inner arm is connected to the mirror head. By making the outer arm hollow, a light weight yet strong construction can be achieved.

In order to keep the mirror head compact and to take advantage of the internal space defined by the hollow outer arms, drive components and stabilising components are advantageously mounted on the inner arm for action against the inside of the outer arm. A difficulty with this design arises in coordination of the drive of the two arms to ensure that skewing and jamming does not occur. Where a single drive motor is employed, a further difficulty arises in transferring the output of a single drive motor to drive components within the inner arms.

Two designs developed by the applicant formed the subject of earlier filed International Patent Application Nos. PCT/AU00/00077 and PCT/AU02/01237. In the first of those patent applications, a system employing cables extending from the head into the arm is disclosed. In the second patent application, a flexible toothed belt extends from the head into the arm.

It is an object of the present invention to provide an improved and simplified power telescoping vehicle external mirror assembly that overcomes at least some of the above problems.

SUMMARY OF THE INVENTION

According to a first aspect of the invention there is provided a vehicle external rear view mirror assembly having an extension and retraction mechanism for a pair of telescopic arms that connect a mirror head to a mirror mounting bracket, the assembly comprising:

a bracket and a mirror head;
 a pair of spaced apart substantially parallel hollow outer arm assemblies extending from the bracket, each outer arm assembly having a front portion and a rear portion, the front portion having a rack extending longitudinally of the arm towards a distal end;
 a pair of spaced apart substantially parallel inner arm assemblies mounted to the mirror head and extending into respective outer arm assemblies for relative sliding movement out of and into respective outer arm assemblies, each inner arm assembly having a front portion and a rear portion;
 a pair of driving pinion gears, each gear rotatably supported within the mirror head in a position in line with a respective inner arm assembly and engaging a respective rack;
 a pinion drive shaft assembly mounted to the mirror head and having a drive shaft extending between the pinion gears along a drive axis;
 a drive motor mounted to the mirror head, the motor having an output shaft; and
 a gear train operatively interposed between the output shaft and the pinion drive shaft assembly, the drive motor driving the inner arm assemblies to move telescopically with respect to their respective outer arm assemblies,
 wherein each outer arm assembly is recessed back from the distal end towards the bracket to allow the pinion drive shaft to travel towards the bracket behind the front portion of the outer arm assembly.

Preferably the assembly further comprises one or a pair of stability systems, for one or each telescopic arm, one or each stability system comprising:

an inboard contact surface;
 an outboard contact surface laterally spaced apart from and outboard of the inboard contact surface with respect to the bracket, both contact surfaces located at the front portion of its respective inner arm assembly and engaging the front portion of the outer arm assembly; and
 an intermediate contact surface located at the rear portion of its respective inner arm assembly at a lateral position intermediate the inboard and outboard apart contact surfaces and engaging the rear portion of the outer arm assembly.

Preferably any two of the inboard, outboard and intermediate contact surfaces are fixed with respect to its respective inner arm assembly and the other of the inboard, outboard and intermediate contact surfaces is resiliently moveable and outwardly biased with respect to its respective inner arm assembly.

Preferably the intermediate contact surface is resiliently moveable with respect to its respective inner arm assembly.

Preferably the intermediate contact surface is supported by a leg that is hingedly mounted about a knife edge to its respective inner arm assembly, the knife edge disposed laterally with respect to the inner arm assembly.

Preferably the or each stability system further comprises a spring mounted between its respective inner arm and the leg to bias the intermediate contact surface into engagement with the rear portion of its respective the outer arm assembly.

Preferably the or each intermediate contact surface is a surface of a wheel, the wheel rotatably supported by the leg.

Preferably the pinion drive shaft comprises a unitary shaft of constant non-circular cross section and preferably the shaft is metal.

Preferably the shaft assembly further comprises a pair of spaced apart hubs, each hub defining an aperture lockably receiving the shaft and an outer bearing surface engaging the mirror head.

Preferably each hub passes through and keys to a respective pinion gear thereby securing the pinion gear to the shaft for rotation therewith.

Preferably the front portion of the outer arm assembly comprises a rack member defining said rack and a pair of parallel spaced apart rails located either side of the rack, the rails of the rack member engaged by the inboard and outboard contact surfaces to stabilise the inner arm assembly with respect to the outer arm assembly.

Preferably at least one of the racks is longitudinally split into a pair of spaced apart parallel rack portions with a channel between the rack portions and wherein its respective pinion gear is mutually shaped such that a cable can be accommodated within the channel for power transmission from the vehicle to the mirror head.

According to a second aspect of the invention there is provided a vehicle external rear view mirror assembly having an extension and retraction mechanism for a pair of telescopic arms that connect a mirror head to a mirror mounting bracket, the assembly comprising:

a bracket and a mirror head;

a pair of spaced apart substantially parallel hollow outer arm assemblies extending from the bracket, each outer arm assembly having a front portion and a rear portion, the front portion having a driven portion extending longitudinally of the arm towards a distal end;

a pair of spaced apart substantially parallel inner arm assemblies mounted to the mirror head and extending into respective outer arm assemblies for relative sliding movement out of and into respective outer arm assemblies, each inner arm assembly having a front portion and a rear portion;

a pair of driving wheels, each wheel rotatably supported within the mirror head in a position in line with a respective inner arm assembly and engaging a respective driven portion;

a main drive shaft assembly mounted to the mirror head and having a drive shaft extending between the driving wheels along a drive axis;

a drive motor mounted to the mirror head, the motor having an output shaft; and     a gear train operatively interposed between the output shaft and the main drive shaft, the drive motor driving the inner arm assemblies to move telescopically with respect to their respective outer arm assemblies,     wherein each outer arm assembly is recessed back from the distal end towards the bracket to allow the main drive shaft to travel towards the bracket behind the front portion of the outer arm assembly.

Preferably respective driving wheels and driven portions are mutually shaped such that a wedging action occurs between each driven wheel and its respective driven portion, thereby reducing the tendency for slippage to occur between each driven wheel and its respective driven portion.

Preferably each driven portion comprises a pair of parallel spaced apart inwardly converging driven surfaces for wedgeably receiving the driving wheel.

Preferably the pinion drive shaft comprises a unitary metal shaft of constant non-circular cross section.

Preferably the shaft assembly further comprises a pair of spaced apart hubs, each hub defining an aperture lockably receiving the shaft and an outer bearing surface engaging the mirror head.

Preferably each hub passes through and keys to a respective driving wheel thereby securing the driving wheel to the shaft for rotation therewith.

According to a third aspect of the invention there is provided a vehicle external rear view mirror assembly having at least one telescopic arm that connects a mirror head to a mirror mounting bracket, the assembly comprising:

a bracket and a mirror head;

a hollow outer arm assembly extending from the bracket, the outer arm assembly having a front portion and a rear portion;

an inner arm assembly mounted to the mirror head and extending into the outer arm assembly for relative sliding movement out of and into the outer arm assembly, the inner arm assembly having a front portion and a rear portion; and     a stability system, the stability system comprising:

an inboard contact surface;

an outboard contact surface laterally spaced apart from and outboard of the inboard contact surface with respect to the bracket, both contact surfaces located at the front portion of its respective inner arm assembly and engaging the front portion of the outer arm assembly; and         an intermediate contact surface located at the rear portion of the inner arm assembly at a lateral position intermediate the inboard and outboard apart contact surfaces and engaging the rear portion of the outer arm assembly,         wherein any two of the inboard, outboard and intermediate contact surfaces are fixed with respect to the inner arm assembly and the other of the inboard, outboard and intermediate contact surfaces is resiliently moveable and outwardly biased with respect to the inner arm assembly.

Preferably the intermediate contact surface is supported by a leg that is hingedly mounted about a knife edge to the inner arm assembly, the knife edge disposed laterally with respect to the inner arm assembly.

Preferably the stability system further comprises a spring mounted between the inner arm and the leg to bias the intermediate contact surface into engagement with the rear portion of the outer arm assembly.

Preferably the intermediate contact surface is a surface of a wheel, the wheel rotatably supported by the leg.

Preferably there is provided a vehicle external rear view mirror assembly having an extension and retraction mechanism for a telescopic arm that connect a mirror head to a mirror mounting bracket, the assembly comprising:

a bracket and a mirror head;

a hollow outer arm assembly extending from the bracket, and having a driven portion extending longitudinally of the arm towards a distal end;

an inner arm assembly mounted to the mirror head and extending into the outer arm assembly for relative sliding movement out of and into the outer arm assembly;

a driving wheel, rotatably supported within the mirror head in a position in line with the inner arm assembly and engaging the driven portion;

a main drive shaft assembly mounted to the mirror head and having a drive shaft extending between the driving wheels along a drive axis;

a drive motor mounted to the mirror head, the motor having an output shaft; and     a gear train operatively interposed between the output shaft and the driving wheel, the drive motor driving the inner arm assembly to move telescopically with respect to the outer arm assembly,     wherein the driving wheel and driven portion are mutually shaped such that a wedging action occurs between the driven wheel and the driven portion, the wedging action reducing the tendency for slippage to occur between the driven wheel and the driven portion.

Preferably the driven portion comprises a pair of parallel spaced apart inwardly converging surfaces for wedgeably receiving the driving wheel.

Specific embodiments of the invention will now be described in some further detail with reference to and as illustrated in the accompanying figures. These embodiments are illustrative, and are not meant to be restrictive of the scope of the invention.

DETAILED DESCRIPTION OF PREFERRED EMBODIMENTS OF THE INVENTION

Preferred embodiments of the invention are illustrated in the accompanying representations in which.

Figure 1:
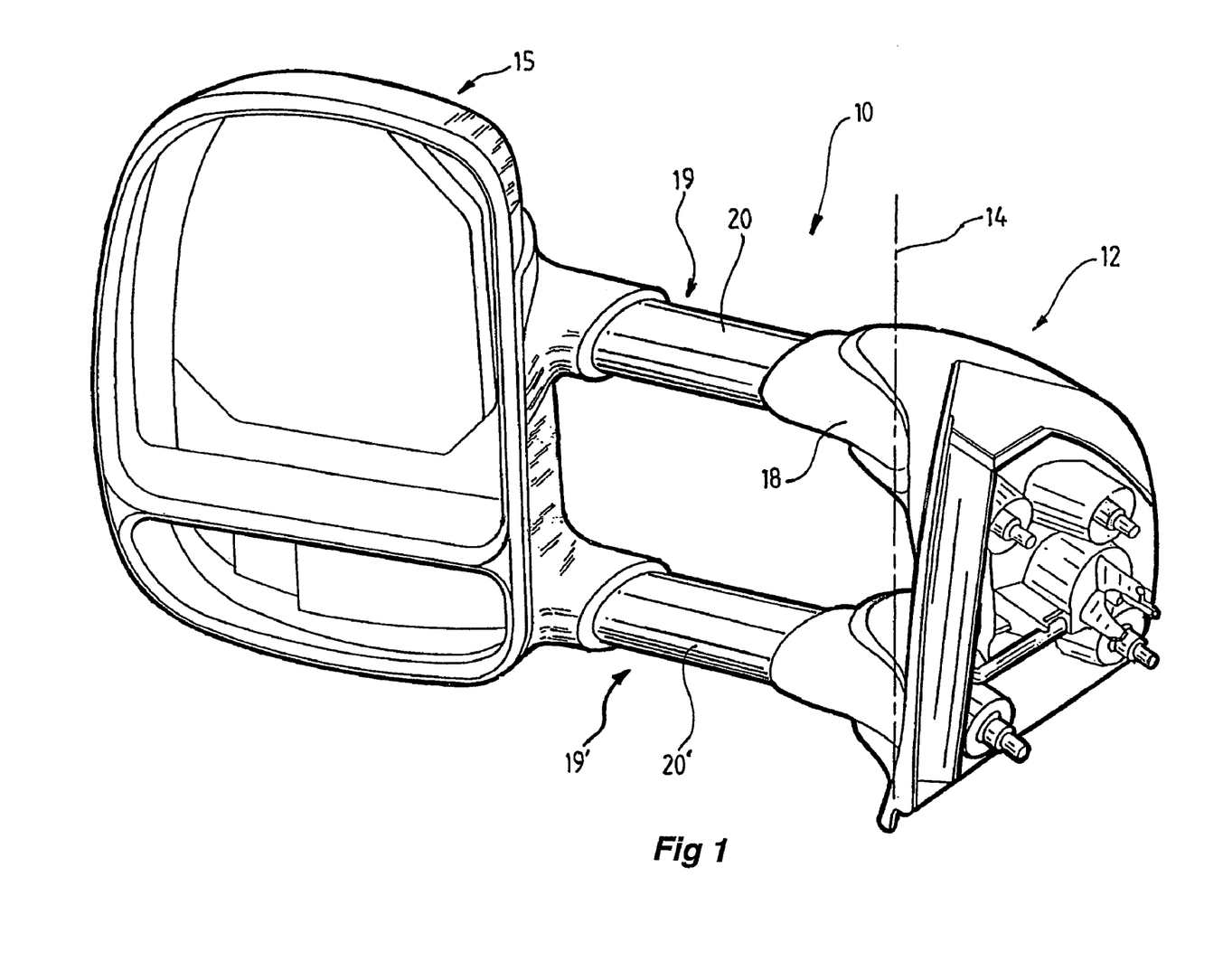
FIG. 1 shows a perspective view of the general arrangement of an external rear view mirror assembly according to an embodiment of the invention.
Figure 2A:
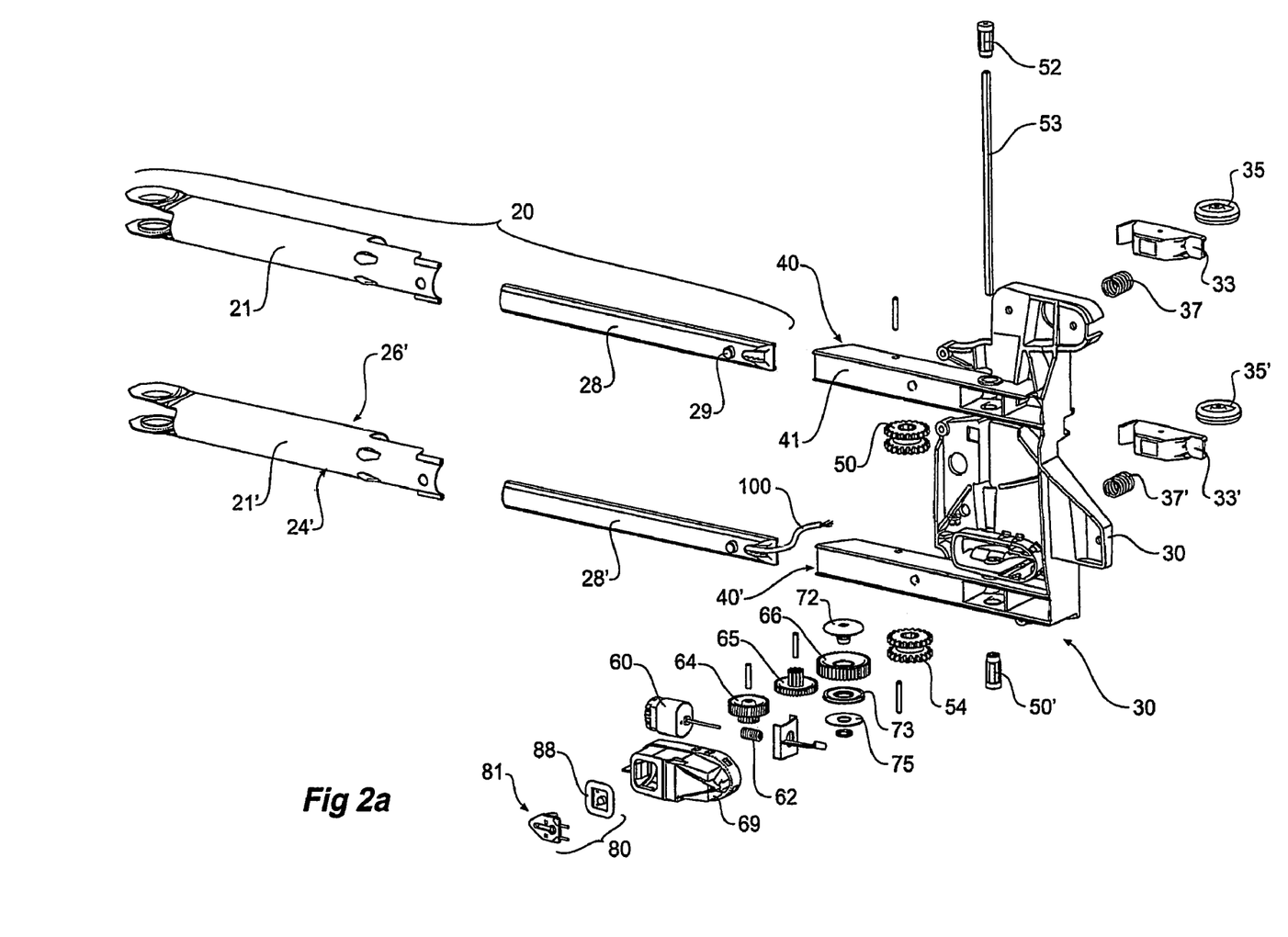
FIG. 2a shows an exploded perspective view of the mirror of FIG. 1.
Figure 2B:
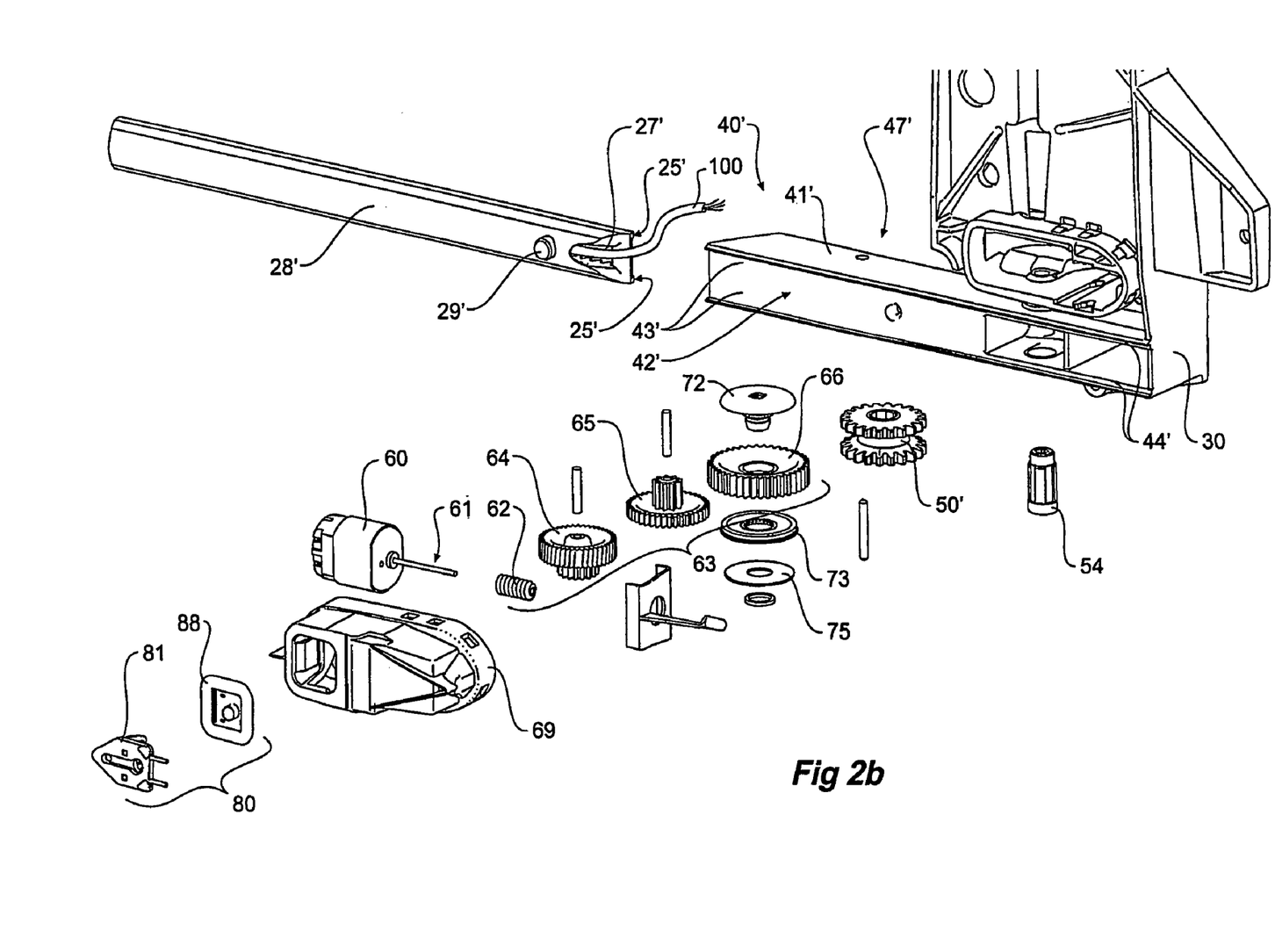
FIG. 2b is similar to that of FIG. 2a but shows the distal end of the assembly in more detail.
Figure 3:
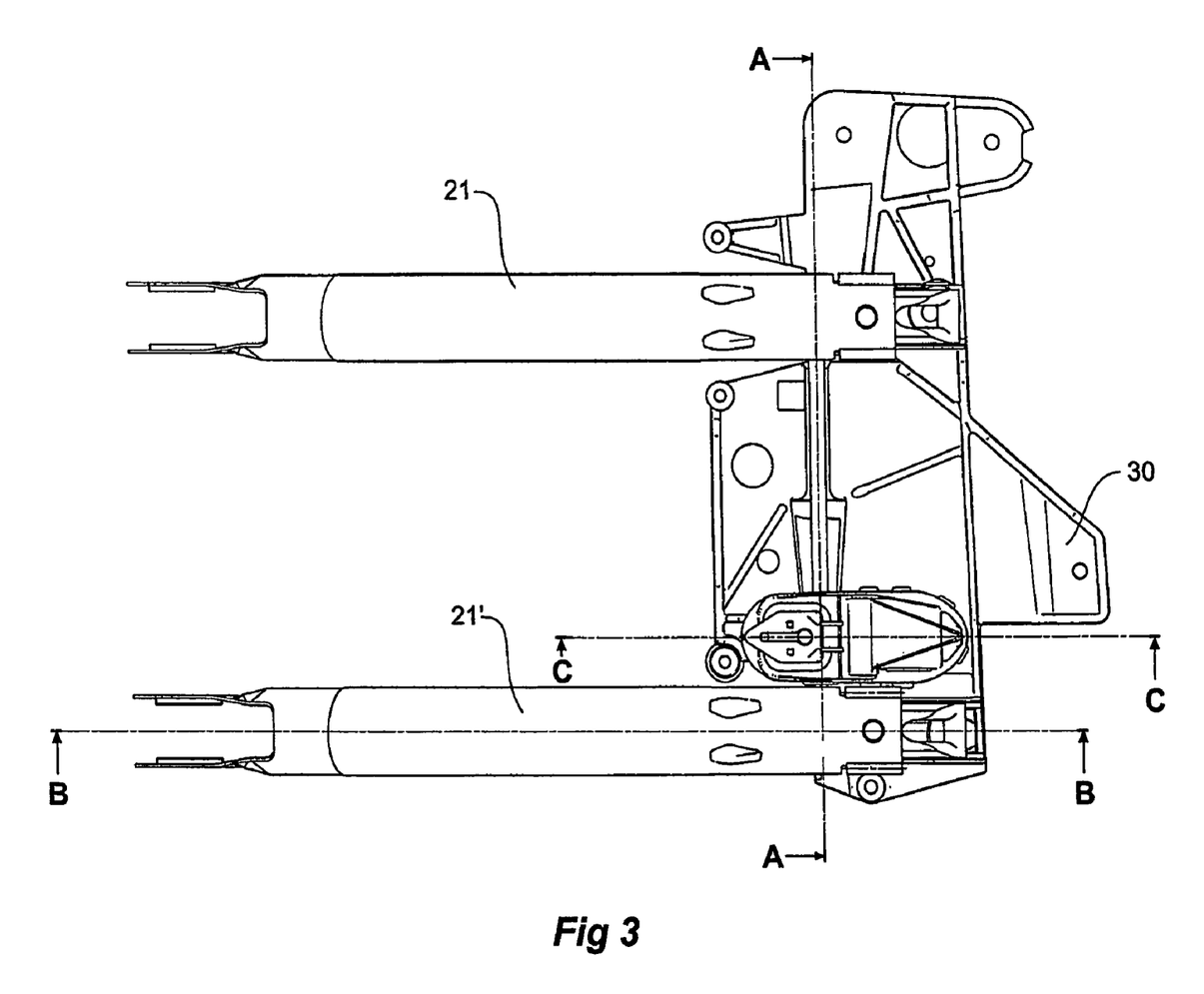
FIG. 3 is a side view of the assembly shown in FIG. 1.
Figure 8:
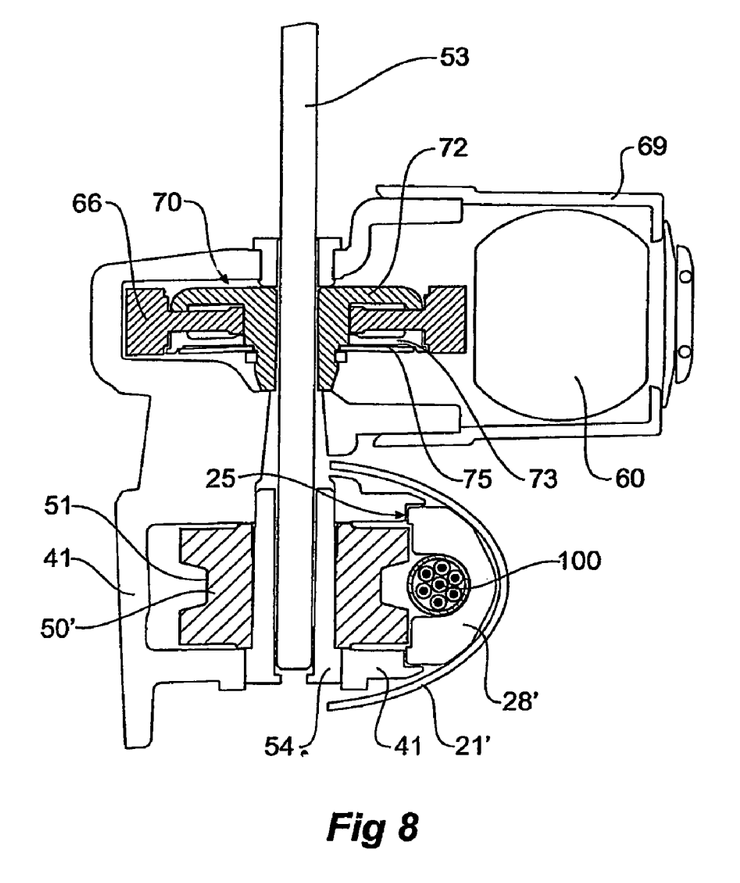
FIG. 8 shows a more detailed sectional view through section A-A as indicated by arrow E on FIG. 4.

Referring to FIG. 1, a vehicle external rear view mirror assembly 10 having a head 15 and a bracket 12 is shown. Bracket 12 attaches to the side of a vehicle. The mirror head 15 is telescopically moveable with respect to the bracket 12. Now referring to FIGS. 1 and 2a, the assembly 10 comprises a pair of spaced apart substantially parallel hollow outer arm assemblies 20 and 20' extending from the bracket 12 and a pair of spaced apart substantially parallel inner arm assemblies 40 and 40' mounted to the head 15 and extending into respective outer arm assemblies 20 and 20' for relative sliding movement out of and into them. A pair of driving pinion gears 50 and 50', each rotatably supported within a respective inner arm bodies 41 and 41' engage respective racks 28 and 28' as can be seen in FIGS. 2a, 2b and 8. A pinion drive shaft 53 mounted to the head and extending between the pinion gears 50 and 50' extends along a drive axis which is substantially perpendicular to the rack members 28 and 28'. Alternatively, where different gear arrangements are employed the drive shaft may be disposed at an angle with respect to the racks.

Referring now to FIG. 2b, a drive motor 60 mounted to the head 15 is shown. The motor 60 has an output shaft 61 driving through a gear train 63 operatively interposed between the output shaft 61 and the pinion drive shaft 53 (shown in FIGS. 2a, 2b and 4).

Figure 6:
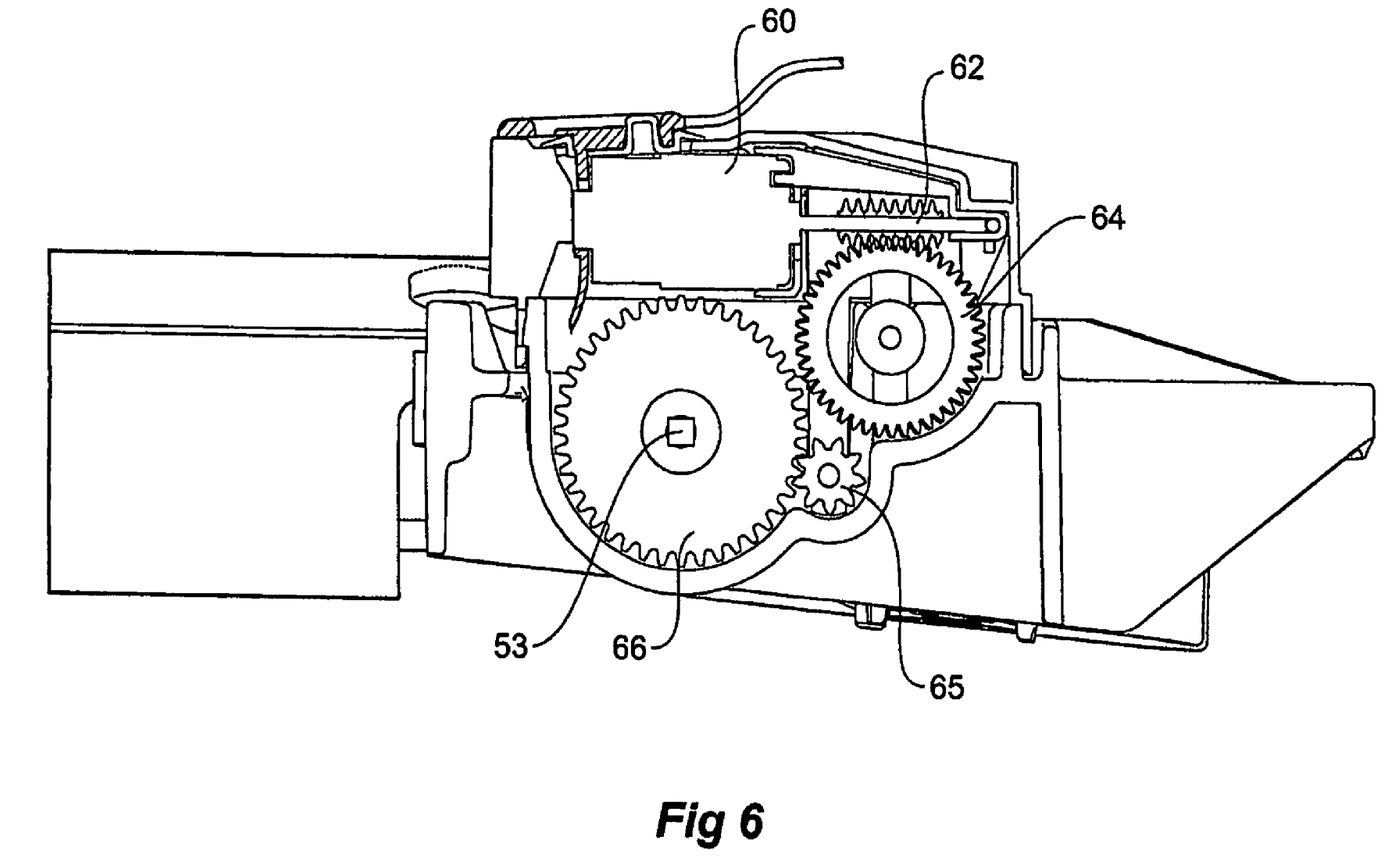
FIG. 6 is a cross-sectional view through section line C-C illustrated in FIG. 3.

Referring to FIGS. 2b and 6, the gear train 63 comprises a worm gear 62, a first gear combination 64, an intermediate gear assembly 65 and a third gear 66. The drive motor 60 drives the inner arm assemblies 40 and 40' to move telescopically with respect to their outer arm assemblies 20 and 20'.

Figure 5A:
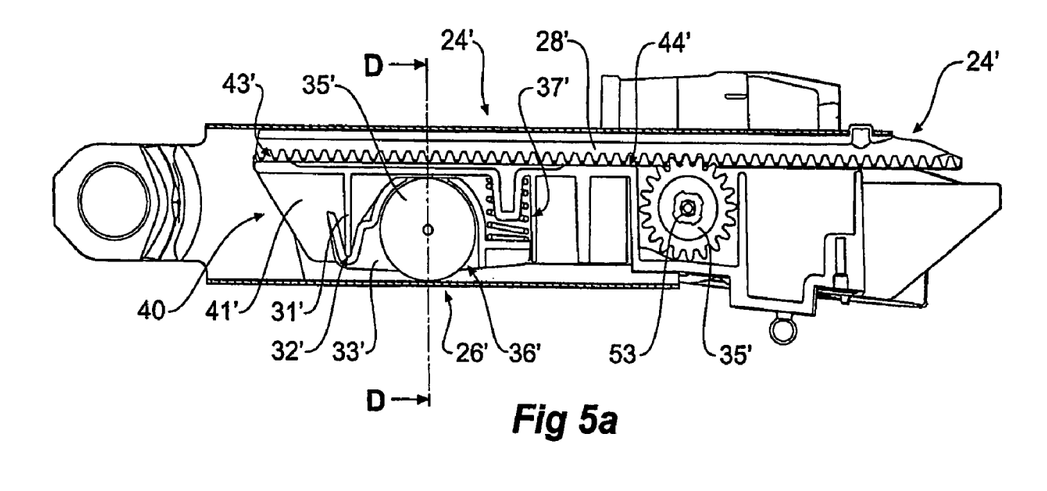
FIGS. 5a and 5b are sectioned views through section B-B indicated on FIG. 3 showing the mirror head in a retracted and extended positions respectively.
Figure 5B:
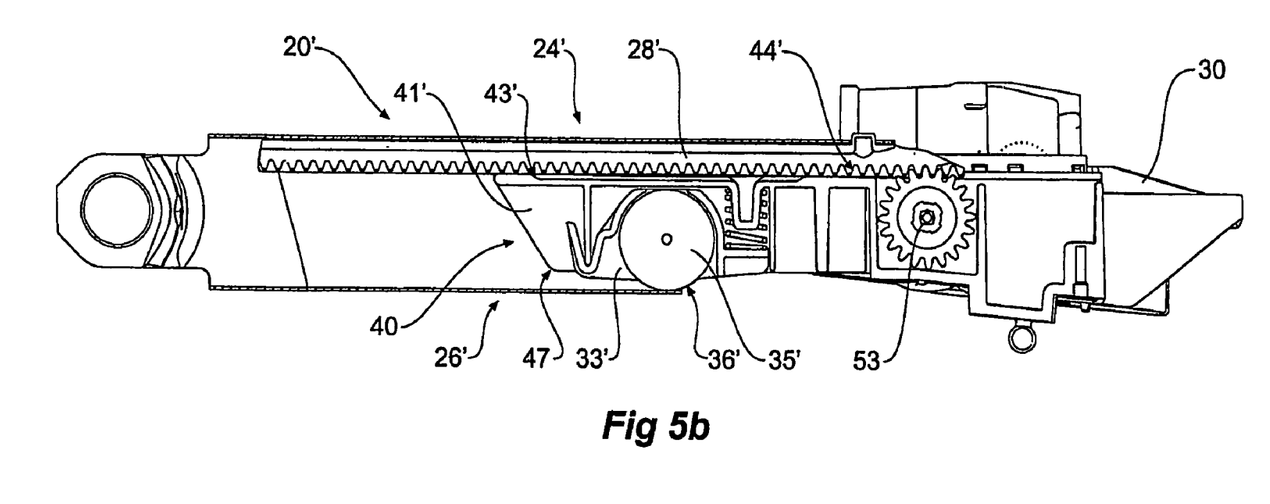

Now referring to FIGS. 5a and 5b, it can be seen that each outer arm assembly 20 has a front portion 24 and a rear portion 26, the front portion 24 having a rack member 28. Each inner arm assembly 40 and 40' also has a front portion and a rear portion. The front portion 42' and rear portion 47' of the inner arm 40' are most clearly seen in FIG. 2b. Reading FIGS. 5a, 5b and 2b together, the pair of stability systems provided by the assembly will now be explained. On the front portion 42' of the inner arm 40' is an inboard contact surface 43' and an outboard contact surface 44'. The outboard contact surface 44' is laterally spaced apart from and outboard of the inboard contact surface 43'. Both contact surfaces 43' and 44' engage the front portion 24' of the outer arm assembly 20'. More Specifically, the contact surfaces 43' and 44' engage contact rails 25' formed on the rear side of the rack member 28'.

Figure 7:
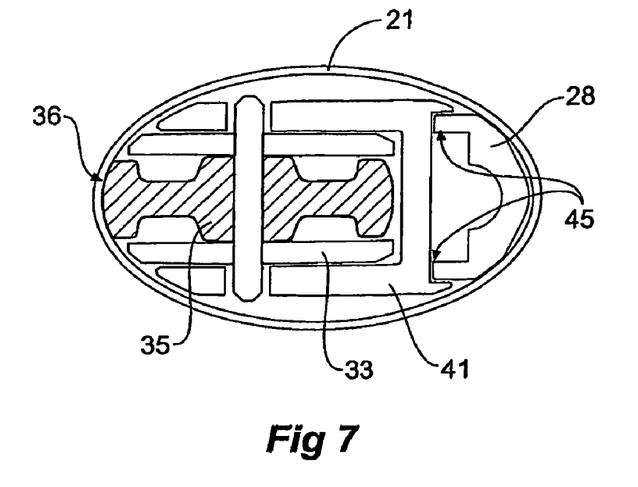
FIG. 7 is a cross-sectional view through section line D-D illustrated in FIG. 5a (rotated through 90 degrees clockwise).

An intermediate contact surface in the form of the periphery 36' of a wheel 35', is mounted to the rear portion 47' of the inner arm body 41' at a lateral position intermediate the inboard and outboard contact surface 43' and 44'. The intermediate contact surface, that is the wheel periphery 36', runs along the rear portion 26' of the outer arm 20' as is most clearly shown in FIG. 5b and in FIG. 7.

The size and shape of the contact area 43, 43', 44 and 44' can be varied through different embodiments of the invention. With the embodiment illustrated in FIGS. 1 to 8, the approximate length of the inboard and outboard contact surfaces can be seen from FIGS. 5a and 5b (43' and 44'). The height of the contact areas is apparent from FIG. 8, although, because of the position of the section A-A from which FIG. 8 is derived, no contact is shown in this Figure. This is best understood by referring to FIGS. 5a and 5b which show the lateral positions of the contact areas 43' and 44' and "dip" between them along the inner arm body 41'. The exact shape of the "dip" or depression between the contact areas 43' and 44' and the shape of the transition from the dip upto the contact areas can be varied. For instance, it may be desirable to have a smooth gradual curve transition so that as each contact area "beds-in" and wears, it increases in size, thereby reducing its tendency to wear further.

With the embodiment of the invention described above, a pair of stability systems is used. In other embodiments of the invention, a single stability system can be employed in either the upper of lower arm.

One of the difficulties in implementing a dual drive system inside a dual arm mirror assembly is in transferring drive from a single motor into the arms in a simple way with the minimum number of intermediate drive train components. With the embodiment of the invention shown in the drawings, this has been achieved in part by having the outer arm-assembly 20 recessed back from the distal end towards the bracket as is shown in FIGS. 5a and 5b. In particular, referring to FIGS. 5a and 5b, it can be seen that the rear portion 26 of the outer arm is recessed relative to the front portion 24 of the outer arm assembly. This allows the drive shaft 53 to travel towards the bracket 12 behind the front portion 24 of the outer arm assembly 20. This is also apparent from FIG. 3. The stability system is arranged to take advantage of the resulting geometry. Specifically, the outboard contact surface 44 extends out well beyond the end of the rear portion 26 of the outer arm assembly 20 and the intermediate contact surface 36 rolls almost to the end of the rear portion 26 as is shown in FIG. 5b.

By supporting the wheel 35 on a leg or carrier 33 that is hingedly mounted for rotation about an axis substantially parallel to the drive axis of the pinion drive shaft 53, "slop"

(unwanted lateral movement) can be virtually eliminated in a direction parallel to the arms. This is achieved by having a blade 31' (shown in FIG. 5a) extending from the inner arm body 41' projecting into a groove 38' formed by the leg 33'. The wedging action between the blade and the groove eliminates slop.

A coil spring 37' mounted between the inner arm 41' and the leg 33' biases the wheel 35' and hence the intermediate contact surface 36' into engagement with the rear portion 26' of the outer arm assembly.

With this embodiment of the invention, the intermediate contact surface 36 is centrally located between the inboard and outboard contact surfaces 43 and 44. This, combined with the broad 'stance' achieved by the wide spread between the inboard and outboard contact surfaces 43 and 44, results in a very stable arrangement. This is important to minimise the vibration of mirror head and hence the mirror glass. The design of the stability system is also such that even with substantial manufacturing tolerance, a stability is maintained between the inner and outer arm assemblies.

A further important feature of the stability system that is clearly seen in FIGS. 5a, 5b, 5c and 5d, is the fact that only one of the contact surfaces that bear against the outer arm is resiliently movable and outwardly biased with respect to its inner arm. More specifically, with the embodiment illustrated, only the intermediate contact surface 36 is resiliently movable by virtue of spring 37. This provides a stable connection between the inner and outer arms, which improves the vibration performance of the mirror head as compared to the applicant's earlier design described in the aforementioned International Patent Application PCT/AU02/01237.

In that application, a stability system employs a pair of spaced apart spring mounted contact surfaces. With such an arrangement, a "see-sawing" action can occur with the two springs providing opposite torque reactions. The single spring arrangement shown in FIGS. 5a to 5d is inherently much more stable than earlier arrangements.

With this embodiment of the invention, the rack 27 is defined by teeth on the rack member 28. This can be seen in FIG. 2b. The rack member 28 is a separable part of the front portion 24 of the outer arm assembly 20. The rack member 28 has a projection 29 that fits within a hole 23 within the outer tube 21 of the outer arm assembly 20 as shown in FIG. 2b. In other embodiments of the invention, the rack member 28 may be integral with the outer arm 20.

The shape of the rack members 28 and 28' and their corresponding pinion gears 50 and 50' are such that a power transmission cable can be accommodated as is shown in FIGS. 2b and 8. More specifically the rack members define a rack that comprises a pair of spaced apart parallel rack portions with a channel 28a between the rack portions 28b and 28c. The pinion gears 50 and 50' have a narrowed or "waisted" portion 51 and 51', that together with the channels 28a and 28a' provide a space to accommodate the power transmission cable 100.

In order to allow the power telescoping mechanism to be manually overridden without damage to the gear train components, a clutch assembly 70 illustrated on FIGS. 8 and 2b is provided. Referring to FIG. 2b it can be seen that drive from motor 60 through gear train 63 turns gear 66.

Figure 4:
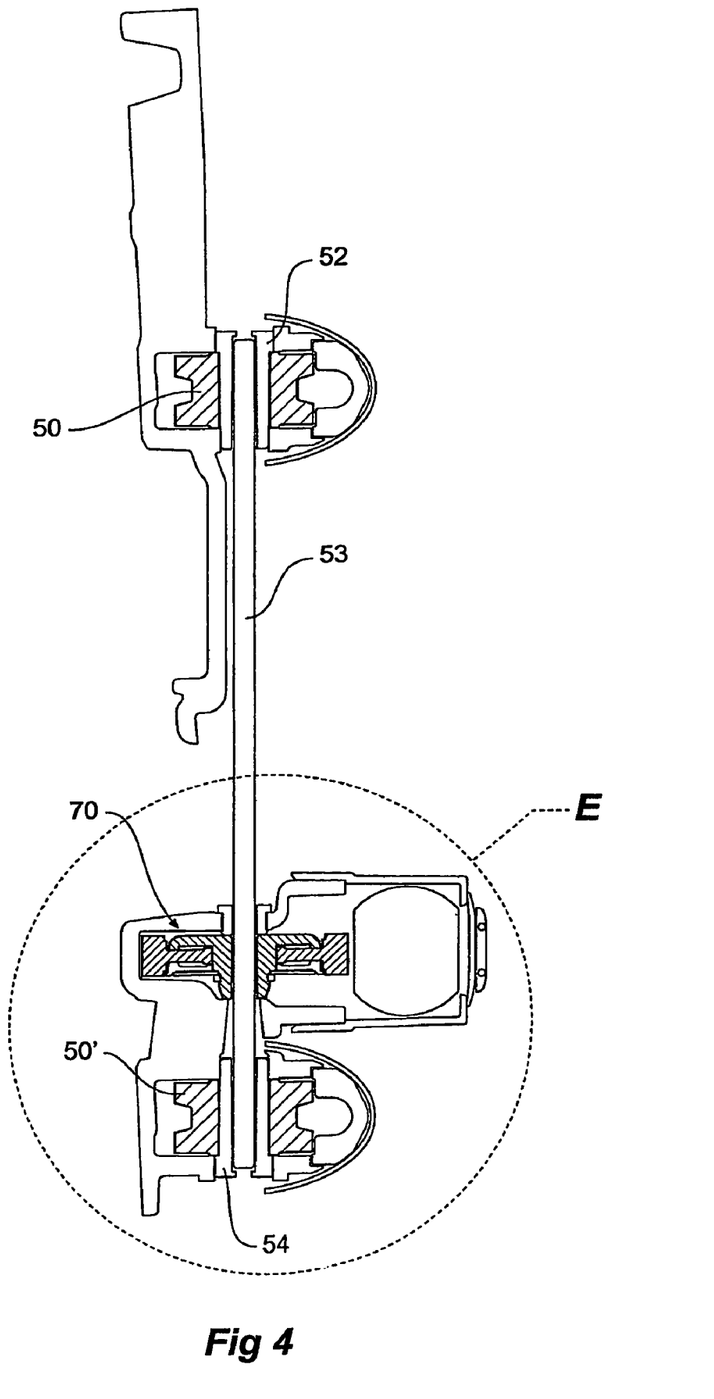
FIG. 4 is a cross-sectional view through section line A-A illustrated in FIG. 3.

An improved drive shaft assembly is illustrated in FIG. 4. From FIGS. 4 and 2a it can be seen that the drive shaft 53 comprises a unitary metal shaft of constant non-circular cross section. With this embodiment the shaft is metal and has a square cross section. By employing a simple square cross section shaft of metal, costs are reduced as it is not necessary to provide splines for connection to gears or other drive components.

Again referring to FIG. 4 it can be seen that the drive shaft assembly includes a pair of spaced apart hubs 52 and 54. These hubs define an aperture which lockably receives the square section shaft. They also have an outer bearing surface, which engages the mirror head 15. With this particular embodiment, the bearing surface engages the inner arm body 41 of the mirror head 15. From FIG. 4 it can also be seen that the hubs 52 and 54 pass through and key to their respective pinion gears 50 and 50' thereby securing them to the shaft 53 for rotation therewith.

By having the hubs 52 and 54 keyed to the shaft 53 and rotating within holes within the inner arms, the need for conventional bearings is eliminated. The hubs are tapered on a leading edge and are provided with an interference fit on the shafts ends allowing for ease of assembly.

Referring now to FIG. 8, gear 66 has a clutch drive plate 72 and a clutch drive plate slave 73 clamped to it by disc spring 75. The clutch drive plate 72 is keyed to the shaft 53 since shaft 53 has a square cross-section and the hole through clutch drive plate 72 is a matching shape (best seen in FIG. 2b). Clutch drive plate slave 73 and clutch drive plate 72 are mutually shaped to prevent relative rotation as can be seen in FIG. 2b. The friction between the outer periphery of the clutch drive plate and the clutch drive plate slave and the disc surface of gear 66 provides the required drive torque and allows slippage for manual override.

Figure 5C:
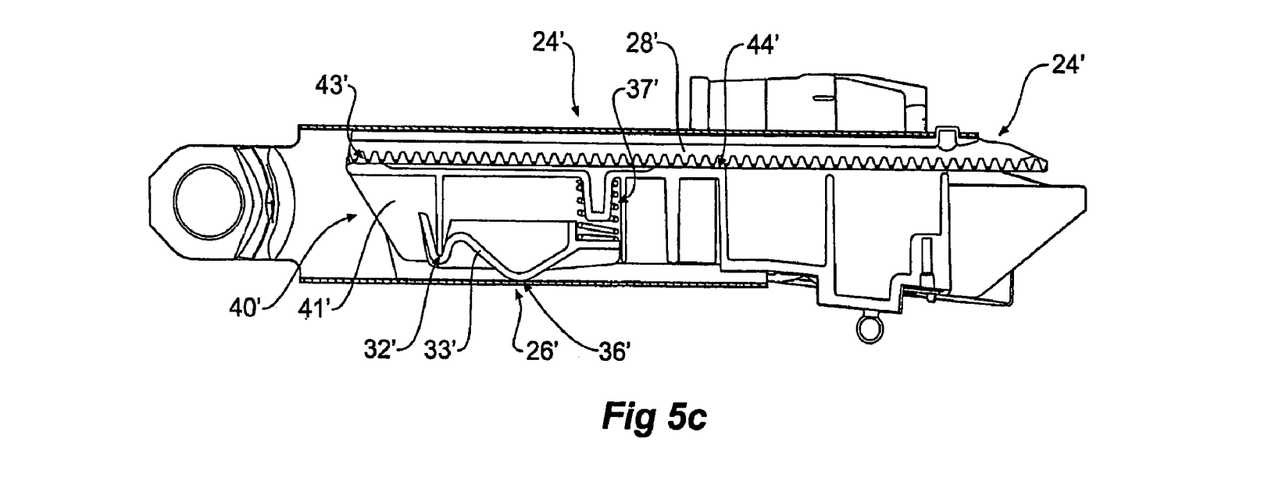
FIGS. 5c and 5d are similar view to those of FIGS. 5a and b, but show an alternative stability component suited to manual telescoping operation.
Figure 5D:
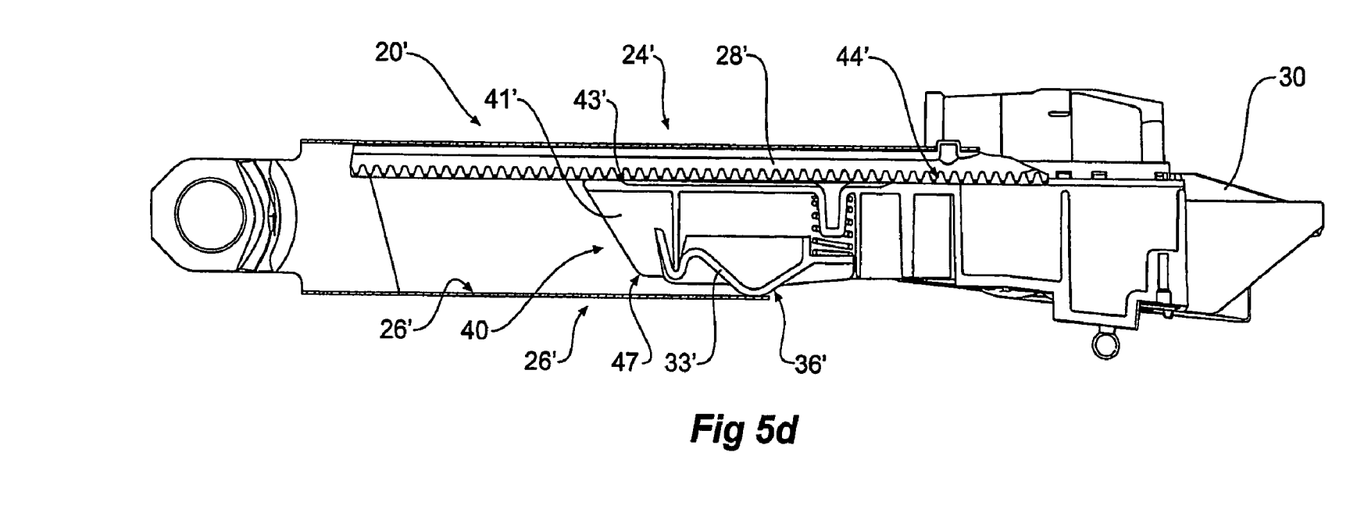

In an alternative embodiment of the invention, the wheel 35 shown in FIGS. 5a and 5b can be replaced by a rounded surface on the leg or carrier 33 as show in FIGS. 5c and d. This particular arrangement will also be suitable for non power telescoping extendable mirrors whereby the extra friction drag gives the required adjustment retention.

With the embodiment of the invention described above, a rack and pinion drive is used within the arms. In an alternative embodiment of the invention, a friction drive system is used in place of the rack and pinion drive system. The friction drive can take many forms. At its simplest, the friction drive comprises a wheel 50 replacing the pinion gear and a driven portion replacing the rack member 28. With such a friction drive system, the clutch mechanism described above can be ?????. Manual override can be achieved by sling movement between the driving wheel and the drive portion.

Figure 9:
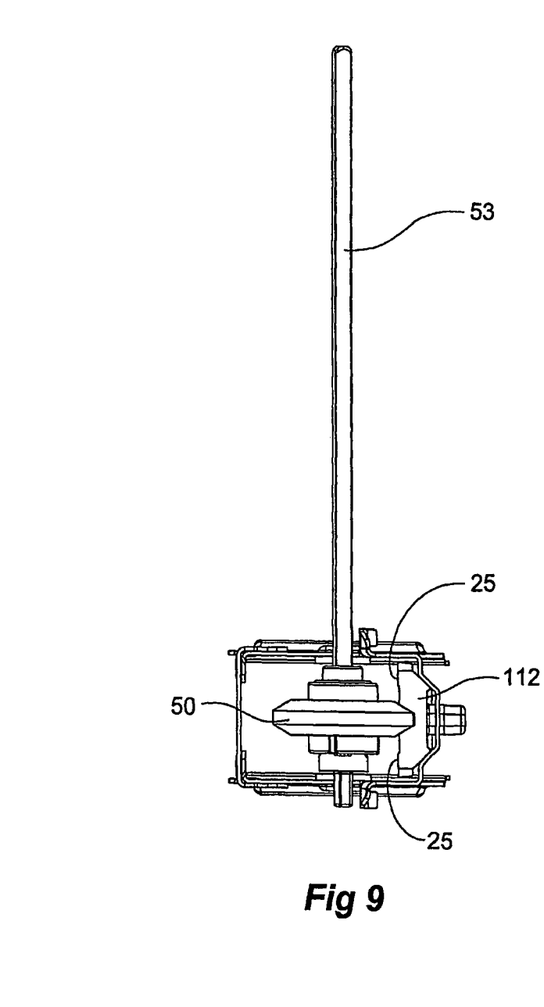
FIGS. 9 and 10 show part sectional and part perspective views respectively of an alternative drive arrangement to that illustrated in FIGS. 2a-8.
Figure 10:
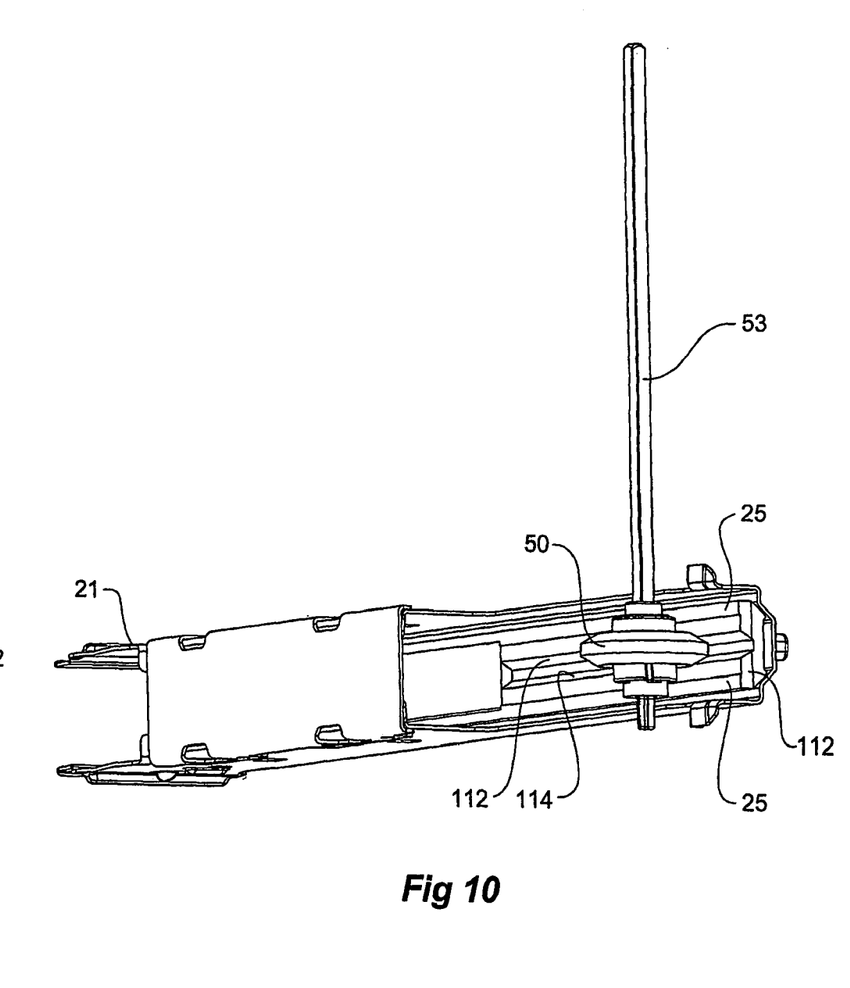

In a further embodiment of the invention, the rack and pinion drive mechanism is replaced by a friction drive in the form of a "V" drive mechanism. The V drive mechanism is illustrated in FIGS. 9 & 10. It differs from the rack and pinion drive in that the rack is replaced with a driven portion in the form of a pair of parallel spaced apart inwardly converging driven surfaces. The driven surfaces are arranged to wedgably receive a driving wheel 50 which takes the place of the pinion gear 50.

The above-described V drive has a number of advantages over a rack and pinion drive. One advantage is that the clutch mechanism can be eliminated with slippage between the driven surfaces and the driving wheels designed to provide manual override of the power telescoping mechanism. In other words, a person can manually push or pull the mirror head in towards or out from the mirror mounting bracket without damage to the drive assembly.

While the present invention has been described in terms of preferred embodiments in order to facilitate better understanding of the invention, it should be appreciated that various modifications can be made without departing from the principles of the invention. Therefore, the invention should be understood to include all such modifications within its scope.

The claims defining the invention are as follows:

1. A vehicle external rear view mirror assembly having an extension and retraction mechanism for a pair of telescopic arms that connect a mirror head to a mirror mounting bracket, the assembly comprising:
    a bracket and a mirror head;
    a pair of spaced apart substantially parallel hollow outer arm assemblies extending from the bracket, each outer arm assembly having a front portion and a rear portion, the front portion having a rack extending longitudinally of the arm towards a distal end;
    a pair of spaced apart substantially parallel inner arm assemblies mounted to the mirror head and extending into respective outer arm assemblies for relative sliding movement out of and into respective outer arm assemblies, each inner arm assembly having a front portion and a rear portion;
    a pair of driving pinion gears, each gear rotatably supported within the mirror head in a position in line with a respective inner arm assembly and engaging a respective rack;
    a pinion drive shaft assembly mounted to the mirror head and having a drive shaft extending between the pinion gears along a drive axis;
    a drive motor mounted to the mirror head, the motor having an output shaft; and
    a gear train operatively interposed between the output shaft and the pinion drive shaft assembly, the drive motor driving the inner arm assemblies to move telescopically with respect to their respective outer arm assemblies,
    wherein each outer arm assembly is recessed back from the distal end towards the bracket to allow the pinion drive shaft to travel towards the bracket behind the front portion of the outer arm assembly.

2. An assembly as claimed in claim 1 further comprising one or a pair of stability systems, for one or each telescopic arm, one or each stability system comprising:
    an inboard contact surface;
    an outboard contact surface laterally spaced apart from and outboard of the inboard contact surface with respect to the bracket, both contact surfaces located at the front portion of its respective inner arm assembly and engaging the front portion of the outer arm assembly; and
    an intermediate contact surface located at the rear portion of its respective inner arm assembly at a lateral position intermediate the inboard and outboard apart contact surfaces and engaging the rear portion of the outer arm assembly.

3. An assembly as claimed in claim 2 wherein, for one or each stability system, any two of the inboard, outboard and intermediate contact surfaces are fixed with respect to its respective inner arm assembly and the other of the inboard, outboard and intermediate contact surfaces is resiliently moveable and outwardly biased with respect to its respective inner arm assembly.

4. An assembly as claimed in claim 3 wherein the or each intermediate contact surface is resiliently moveable with respect to its respective inner arm assembly.

5. An assembly as claimed in claim 4 wherein the or each intermediate contact surface is supported by a leg that is hingedly mounted about a knife edge to its respective inner arm assembly, the knife edge disposed laterally with respect to the inner arm assembly.

6. An assembly as claimed in claim 5 wherein the or each stability system further comprises a spring mounted between its respective inner arm and the leg to bias the intermediate contact surface into engagement with the rear portion of its respective the outer arm assembly.

7. An assembly as claimed in claim 6 wherein the or each intermediate contact surface is a surface of a wheel, the wheel rotatably supported by the leg.

8. An assembly as claimed in claim 1 wherein the pinion drive shaft comprises a unitary shaft of constant non-circular cross section.

9. An assembly as claimed in claim 8 wherein the shaft is metal.

10. An assembly as claimed in claim 9 wherein the shaft assembly further comprises a pair of spaced apart hubs, each hub defining an aperture lockably receiving the shaft and an outer bearing surface engaging the mirror head.

11. An assembly as claimed in claim 10 wherein each hub passes through and keys to a respective pinion gear thereby securing the pinion gear to the shaft for rotation therewith.

12. An assembly as claimed in claim 3 wherein the front portion of the outer arm assembly comprises a rack member defining said rack and a pair of parallel spaced apart rails located either side of the rack, the rails of the rack member engaged by the inboard and outboard contact surfaces to stabilise the inner arm assembly with respect to the outer arm assembly.

13. An assembly as claimed in claim 1 wherein at least one of the racks is longitudinally split into a pair of spaced apart parallel rack portions with a channel between the rack portions and wherein its respective pinion gear is mutually shaped such that a cable can be accommodated within the channel for power transmission from the vehicle to the mirror head.

14. A vehicle external rear view mirror assembly having an extension and retraction mechanism for a pair of telescopic arms that connect a mirror head to a mirror mounting bracket, the assembly comprising:
    a bracket and a mirror head;
    a pair of spaced apart substantially parallel hollow outer arm assemblies extending from the bracket, each outer arm assembly having a front portion and a rear portion, the front portion having a driven portion extending longitudinally of the arm towards a distal end;
    a pair of spaced apart substantially parallel inner arm assemblies mounted to the mirror head and extending into respective outer arm assemblies for relative sliding movement out of and into respective outer arm assemblies, each inner arm assembly having a front portion and a rear portion;
    a pair of driving wheels, each wheel rotatably supported within the mirror head in a position in line with a respective inner arm assembly and engaging a respective driven portion;
    a main drive shaft assembly mounted to the mirror head and having a drive shaft extending between the driving wheels along a drive axis;
    a drive motor mounted to the mirror head, the motor having an output shaft; and
    a gear train operatively interposed between the output shaft and the main drive shaft, the drive motor driving the inner arm assemblies to move telescopically with respect to their respective outer arm assemblies,
    wherein each outer arm assembly is recessed back from the distal end towards the bracket to allow the main drive shaft to travel towards the bracket behind the front portion of the outer arm assembly.

15. An assembly as claimed in claim 14 wherein respective driving wheels and driven portions are mutually shaped such that a wedging action occurs between each driven wheel and its respective driven portion,
thereby reducing the tendency for slippage to occur between each driven wheel and its respective driven portion.

16. An assembly as claimed in claim 15 wherein each driven portion comprises a pair of parallel spaced apart inwardly converging driven surfaces for wedgeably receiving the driving wheel.

17. An assembly as claimed in claim 14 wherein the pinion drive shaft comprises a unitary metal shaft of constant non-circular cross section.

18. An assembly as claimed in claim 17 wherein the shaft assembly further comprises a pair of spaced apart hubs, each hub defining an aperture lockably receiving the shaft and an outer bearing surface engaging the mirror head.

19. An assembly as claimed in claim 18 wherein each hub passes through and keys to a respective driving wheel thereby securing the driving wheel to the shaft for rotation therewith.

20. A vehicle external rear view mirror assembly having at least one telescopic arm that connects a mirror head to a mirror mounting bracket, the assembly comprising:
a bracket and a mirror head;
a hollow outer arm assembly extending from the bracket, the outer arm assembly having a front portion and a rear portion;
an inner arm assembly mounted to the mirror head and extending into the outer arm assembly for relative sliding movement out of and into the outer arm assembly, the inner arm assembly having a front portion and a rear portion; and
a stability system, the stability system comprising:
an inboard contact surface;
an outboard contact surface laterally spaced apart from and outboard of the inboard contact surface with respect to the bracket, both contact surfaces located at the front portion of its respective inner arm assembly and engaging the front portion of the outer arm assembly; and
an intermediate contact surface located at the rear portion of the inner arm assembly at a lateral position intermediate the inboard and outboard apart contact surfaces and engaging the rear portion of the outer arm assembly,
wherein any two of the inboard, outboard and intermediate contact surfaces are fixed with respect to the inner arm assembly and the other of the inboard, outboard and intermediate contact surfaces is resiliently moveable and outwardly biased with respect to the inner arm assembly.

21. An assembly as claimed in claim 20 wherein the intermediate contact surface is supported by a leg that is hingedly mounted about a knife edge to the inner arm assembly, the knife edge disposed laterally with respect to the inner arm assembly.

22. An assembly as claimed in claim 21 wherein the stability system further comprises a spring mounted between the inner arm and the leg to bias the intermediate contact surface into engagement with the rear portion of the outer arm assembly.

23. An assembly as claimed in claim 22 wherein the intermediate contact surface is a surface of a wheel, the wheel rotatably supported by the leg.

24. A vehicle external rear view mirror assembly having an extension and retraction mechanism for a telescopic arm that connect a mirror head to a mirror mounting bracket, the assembly comprising:
a bracket and a mirror head;
a hollow outer arm assembly extending from the bracket, and having a driven portion extending longitudinally of the arm towards a distal end;
an inner arm assembly mounted to the mirror head and extending into the outer arm assembly for relative sliding movement out of and into the outer arm assembly;
a driving wheel, rotatably supported within the mirror head in a position in line with the inner arm assembly and engaging the driven portion;
a main drive shaft assembly mounted to the mirror head and having a drive shaft extending between the driving wheels along a drive axis;
a drive motor mounted to the mirror head, the motor having an output shaft; and
a gear train operatively interposed between the output shaft and the driving wheel, the drive motor driving the inner arm assembly to move telescopically with respect to the outer arm assembly,
wherein the driving wheel and driven portion are mutually shaped such that a wedging action occurs between the driven wheel and the driven portion, the wedging action reducing the tendency for slippage to occur between the driven wheel and the driven portion.

25. An assembly as claimed in claim 24 wherein the driven portion comprises a pair of parallel spaced apart inwardly converging surfaces for wedgeably receiving the driving wheel.

* * * * *